United States Patent
Mercier et al.

[15] 3,654,964
[45] Apr. 11, 1972

[54] PRESSURE VESSELS

[72] Inventors: Jean Mercier, 501 Bloomfield Avenue, Caldwell, N.J.; Jacques H. Mercier, 49 Rue de Naples, Paris, France

[22] Filed: Feb. 20, 1970

[21] Appl. No.: 13,089

[30] Foreign Application Priority Data

Mar. 3, 1969 France....................................690563

[52] U.S. Cl.................................................................138/30
[51] Int. Cl..............................................................F16l 55/00
[58] Field of Search.......................................................138/30

[56] References Cited

UNITED STATES PATENTS

| | | | |
|---|---|---|---|
| 2,339,076 | 1/1944 | Huber | 138/30 |
| 2,878,834 | 3/1959 | Mercier | 138/30 |
| 2,932,321 | 4/1960 | Mercier | 138/30 |
| 3,109,458 | 11/1963 | Mercier | 138/30 |

*Primary Examiner*—Samuel B. Rothberg
*Assistant Examiner*—William H. Wright
*Attorney*—Arthur B. Colvin

[57] ABSTRACT

The present invention relates to a pressure vessel in the form of a container having an enlarged mouth with an externally threaded outer periphery. A cover member having a depending internally threaded wall portion is adapted to be screwed onto the threaded mouth of the container, the cover member and the container having ports leading thereinto. A deformable partition in said container divides the latter into two variable volume chambers in communication respectively with said ports, said deformable partition having a mouth which is secured to a portion of a thin annular supporting member of resilient material, said supporting member having an additional portion extending outwardly from said first portion and two concentric annular zones of retention are provided for said additional portion of said annular supporting member, the innermost annular zone providing a resilient seal and the outermost annular zone providing rigid retention of the outer periphery of said annular supporting member.

11 Claims, 4 Drawing Figures

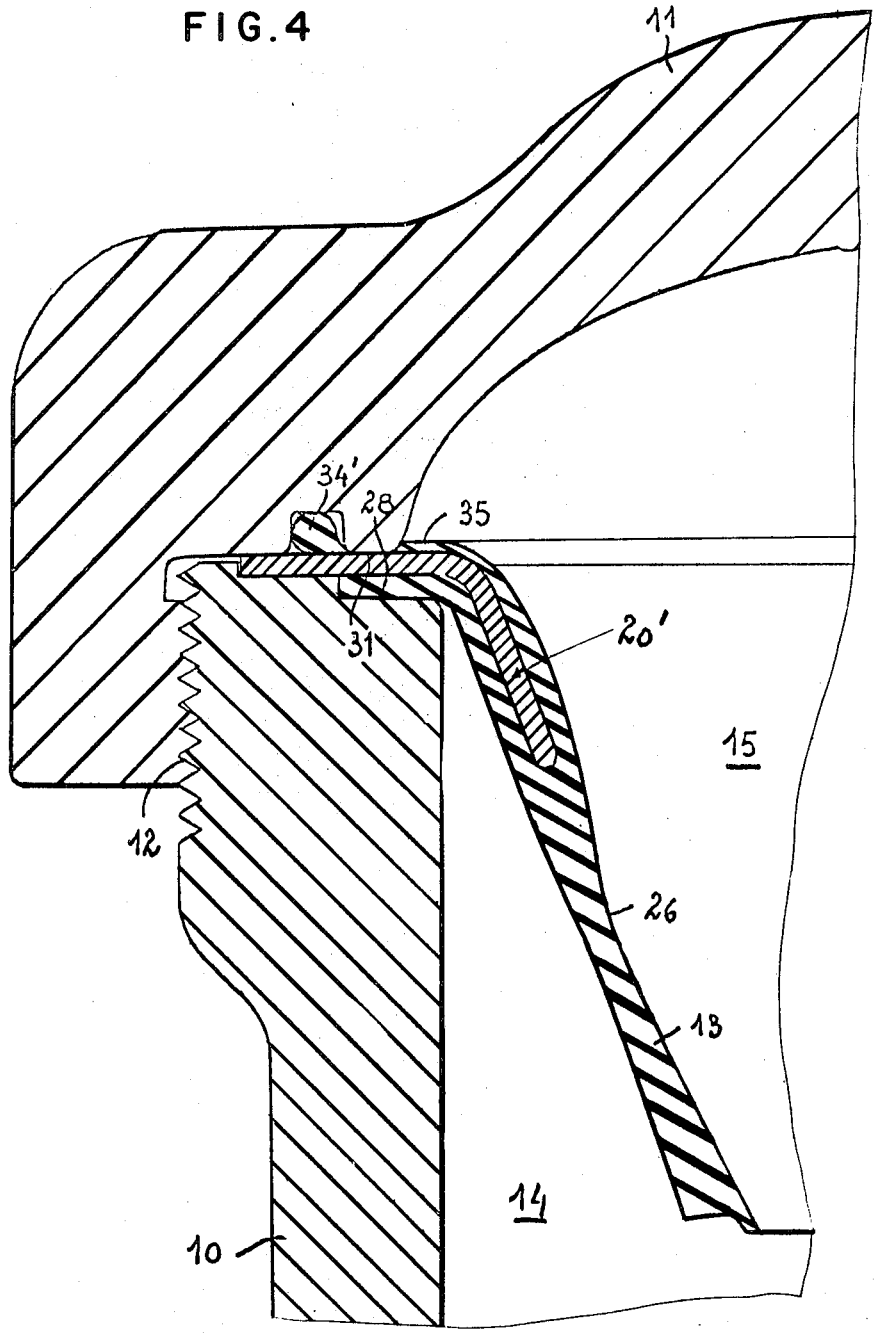

PRESSURE VESSELS

As conducive to an understanding of the invention it is noted that where in pressure vessels of the above type the rim of the deformable partition which may be a bladder, is clamped between two parts of the pressure vessel, such as the container and the cover member, damage to the rim may occur when the parts are assembled. Where, to avoid this problem a support member of rigid material is secured to the mouth of the bladder and only the support member is clamped between the two parts of the pressure vessel, although no damage may be incurred to the bladder, sealing problems will arise.

It is among the objects of the present invention to provide a pressure vessel in which the rim of a deformable partition is dependably secured in position without likelihood of damage to the partition yet with assurance that dependable sealing action will occur which pressure vessel is simple in construction and dependable in operation.

According to the invention from its broader aspects, a pressure vessel is provided in the form of a container of rigid material having an enlarged mouth with an externally threaded outer periphery. A cover member having a depending internally threaded wall portion is adapted to be screwed onto the threaded mouth of the container, the cover member and the container having ports leading thereinto. A deformable partition in said container divides the latter into two variable volume chambers in communication respectively with said ports, said deformable partition having a mouth which is secured to a portion of a thin annular supporting member of resilient material, said supporting member having an additional portion extending outwardly from said first portion and two concentric annular zones of retention are provided for said additional portion of said annular supporting member, the innermost annular zone providing a resilient seal and the outermost annular zone providing rigid retention of the outer periphery of said annular supporting member.

According to a feature of the invention, a second annular sealing means is provided which cooperates with the surface of said additional portion of said annular supporting member opposed to the surface at which the first resilient seal is provided, the first sealing means cooperating with the fluid in one of said chambers and the other sealing means cooperating with the fluid in the other of said chambers.

According to another feature of the invention, the cover member is provided with means which when the cover member is screwed into the container will first react with the additional portion of said annular supporting member to form said resilient seal and thereafter a portion of the cover member will react against the outer periphery of said additional portion of the annular supporting member to urge the latter against an annular portion of said container to provide for rigid retention of said annular supporting member, the annular supporting member being slightly flexed as said resilient seal is formed, such flexure being limited by the clamping of the periphery of said annular supporting member against the annular portion of said container.

In the accompanying drawings in which are shown one or more of various possible embodiments of the several features of the invention:

Figure 1:
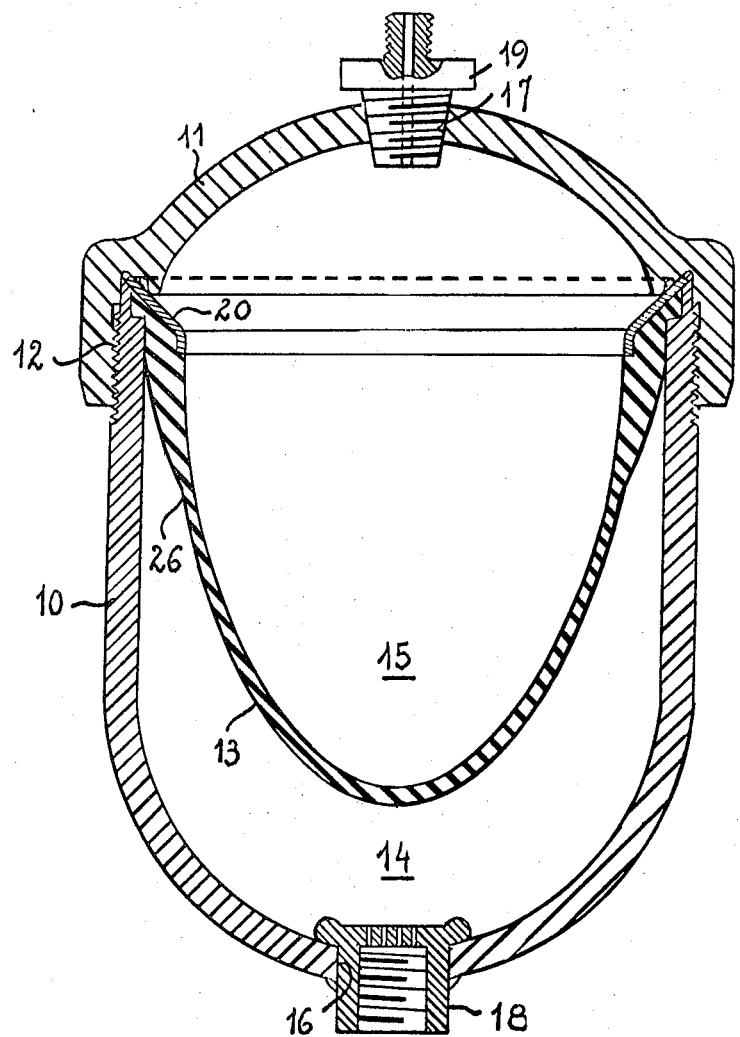
FIG. 1 is a longitudinal sectional view of a pressure vessel according to the invention.
Figure 2:
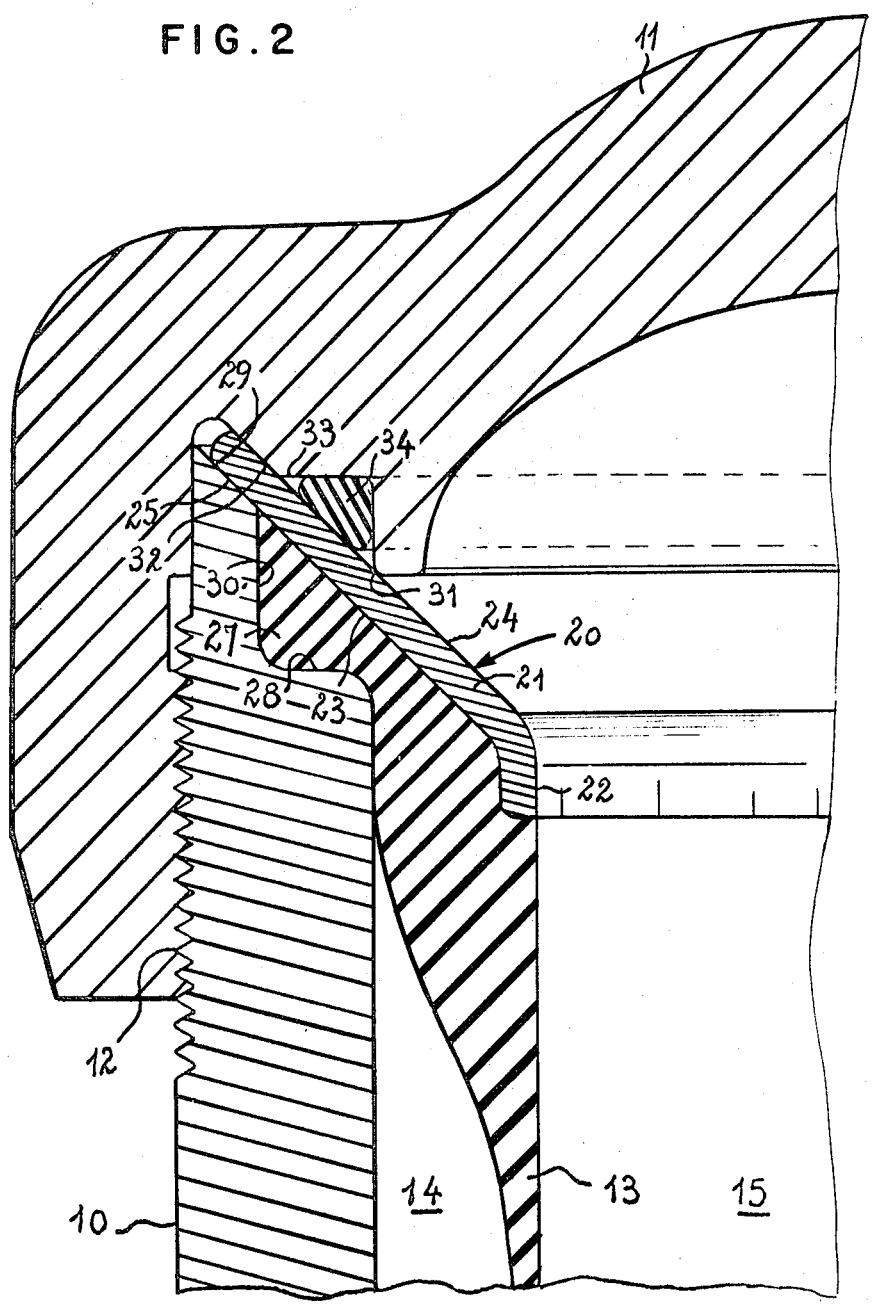
FIG. 2 is a detail longitudinal sectional view on an enlarged scale showing the retaining means for the deformable separator of the embodiment of FIG. 1, and FIGS. 3 and 4 are views similar to FIGS. 2 but of different embodiments of the invention.

Referring now to FIGS. 1 and 2 of the drawings, the pressure vessel which illustratively is a pressure accumulator, comprises a container 10 of strong rigid material capable of withstanding high pressure, said container being substantially spherical at one end and open at its other end. A cover member 11 having a depending peripheral flange is secured to the mouth of the container 10 by the engagement of coacting threads as at 12. The cover member 11 and the container 10 have axially aligned ports 16 and 17, A fitting 19 which carries a conventional air valve (not shown) is screwed into the port 17 and a fitting 18 is secured as by welding in the port 16 to serve as the liquid port through which a liquid such as oil may be admitted or discharged into the container.

Positioned in the container 10 is a deformable partition or separator 13 which divides the interior space of the container into two chambers or compartments 14 and 15. The compartment 14 is in communication with the port 16 and the compartment 15 is in communication with the port 17. These two compartments have variable volumes by reason of the deformability of the partition 21 which illustratively is a collapsible and expansible bladder of resilient material such as rubber or synthetic plastic of like physical characteristics.

Thus, a liquid such as oil may be forced through the fitting 18 in to the compartment 14 and a gas such as air may be forced through the fitting 19 into the compartment 15. The air valve (not shown) positioned in the fitting 19 is normally closed and the fitting 19 is normally connected to a hydraulic installation.

The bladder 13 is desirably substantially conical in configuration and has an enlarged mouth with a thickened rim 27 to which is bonded an annular supporting member 20, preferably of a relatively thin sheet steel.

As shown in FIGS. 1 and 2, the annular supporting member 20 is of generally conical form as shown at 21 with a small cylindrical base portion 22. The angle of the conical portion is preferably in the order of 45°. The annular supporting member is illustratively secured to the inner surface of the rim or mouth of the bladder 13 and has two opposed faces 23, 24 which are respectively oriented toward the container 10 and toward the cover 11. The surface 23 which is oriented toward and container 10 is adhered to the associated rim of the bladder, preferably by being molded therewith and includes an outer peripheral region 25 which extends beyond the mouth of the bladder. The surface 24 which is oriented toward the cover 11 is illustratively devoid of any covering by the material of the bladder 13.

The wall thickness of the bladder 13 is enlarged in the vicinity of the retaining member 20 and is of reduced thickness as at 26 so that during operation of the bladder when it stretches in use, the stresses will not be imparted to the portion of the bladder to which the annular supporting member 20 is secured, i.e., the thickened rim portion 27 of the bladder.

As is clearly shown in FIG. 2, the mouth of container along its inner periphery has an annular groove 30 therein defining an annular shoulder 28 and the mouth of said container is inwardly beveled as at 29. The annular shoulder 28 is substantially perpendicular to the axis of the container and is designed to serve as a seat for the thickened rim 27 of the bladder while the inclined or beveled surface 29 is designed to serve as a seat for the outstanding peripheral uncovered portion 25 of the supporting member 20. In order to retain the annular supporting member 20 and bladder 13 in fixed position, the cover 11 is provided with an annular groove which has an inclined surface 32 adjacent the junction between the depending side wall of the cover member and the top wall thereof. In addition, the cover member has a depending annular rim 31 spaced inwardly from the side wall thereof, the annular space 33 between the inclined surface 32 and the rim 31 serving to receive an "0" ring 34.

The assembly thus provides two annular concentric zones or regions at which force may be exerted against the annular supporting member 20 to retain the latter in place. Thus, there is the outer zone or region defined by the inclined surface 32 which will force the outer periphery of the supporting member against the inclined surface 29 of the container. In addition, there is the inner region or zone defined by the lower peripheral corner of the rim 31 which will react against the inclined surface of the supporting member 20 to compress the thickened rim of the bladder against the shoulder 28 and the side wall of the groove 30 to form a seal.

It is to be noted that the material of the bladder 13 which covers the surface 23 of the annular supporting member, at least in the region of the annular groove 30, will form a seal between the compartment or chamber 14 which is charged with oil and the outside. The "0" ring 34 which is positioned in the annular space 33 which cooperates with the surface 24 of the annular supporting member 20 will form a sealing means between the compressed air in chamber 15 and the outside.

The thickness of the material of the bladder 13 at the thickened rim portion thereof secured to the surface 23 of supporting member 20 and the location of the rim 31 and inclined surface 32 are such that when the cover member is screwed onto the mouth of the container 10 as at 12, the outer corner of rim 31 will first engage the surface 24 of supporting member 20 and thereafter the inclined surface 32 will engage the end 25 of the annular supporting member to urge the latter against inclined surface 29 of the container. The supporting member 20 is of sufficient resilience that it can flex slightly when the outer corner of rim 31 presses thereagainst until abutment of the inclined surface 32 of cover 11 against the outer periphery of the supporting member 20 which will stop further tightening action of the cover member.

Preferably, the thickness of the rim portion 27 of the bladder is such that before assembly of the unit, it is slightly greater than the height of the side wall of annular groove 30 so that the rim will be compressed to be dependably retained in position.

To assemble the unit before the cover 11 is mounted thereon, the bladder 13 is positioned in the container 10 with the thickened rim 27 thereof resting on annular shoulder 28 and with the outer end of annular supporting member 20 resting on inclined wall portion 29. The "0" ring 34 is positioned in the annular space 33 of the cover member and the latter is then screwed as at 12 onto the threaded mouth of the container 10.

As previously described, as the cover is screwed into position, the outer edge of rim 31 will first engage the surface 24 of the annular supporting member 20 and compress the thickened rim portion 27 of the bladder. As the cover is further screwed into position, the annular supporting member will flex slightly until the inclined surface 32 engages the outer peripheral portion of surface 24 urging such outer peripheral portion against the inclined surface 29 to provide a rigid retention for the periphery of the cover member.

Preferably, the surface 25 may have a notch therein to locate the periphery thereof with respect to the surface 29.

In operation of the unit, gas under pressure may first be forced into the chamber 15 through the valve carried by fitting 19 and the bladder 13 will expand, being restrained by the inner wall surface of the container. Oil under pressure may then be forced through the fitting 18 into compartment 14 to charge the latter and compress the gas in the bladder 15 which will thereby deform.

By reason of the provision of the zone of elastic tightening effected by the rim 31 and associated thickened portion 27 of the bladder and annular groove 30, in conjunction with the rigid retention of the periphery of the annular supporting member 20 and the reaction of the "0" ring 34 against the wall of the annular space 33 and the surface 24, an excellent sealing effect will be created between the oil chamber 14, the air chamber 15 and the exterior.

Figure 3:
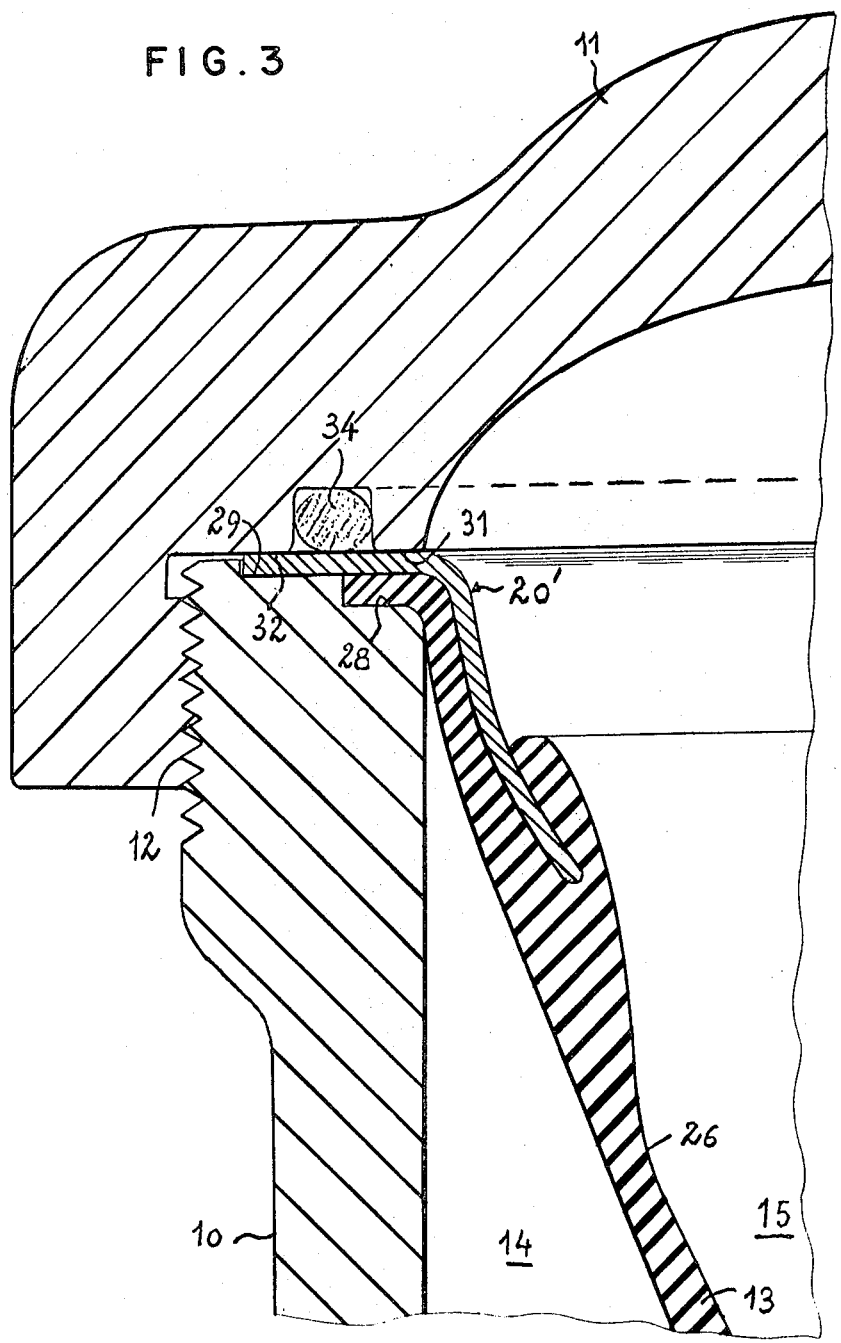

The embodiment shown in FIG. 3 is similar in many respects to the embodiments shown in FIGS. 1 and 2 except for the fact that the annular supporting member 20' has an outstanding annular flange which extends substantially perpendicularly to the axis of the container 10 and rests on the floor 29 of an annular groove in the upper end of said container 10, which floor 29 is also perpendicular to the axis of container 10. With the flange of the annular supporting member so positioned, a portion of the thickened rim of the bladder will rest on the surface 28 of an additional annular groove in the upper end of container 10 adjacent the inner periphery thereof. The cover member 11 which is adapted to be screwed as at 12 on the externally threaded upper end of container 10 has an annular groove in its undersurface in which an annular seal ring 34 is positioned, said annular groove defining the annular depending rim 31. The bladder 13 of the embodiment of FIG. 3 also defines an oil chamber 14 and a gas chamber 15 and has a reduced thickness wall portion 26 adjacent the thickened rim of the bladder 13 to minimize stress on such thickened rim when the bladder is stretched in use.

The annular rim 31 is also designed to engage the top surface of the annular flange when the cover 11 is tightened prior to the rigid clampling of the periphery of the annular flange between the surfaces 29 and 32.

The embodiment of FIG. 4, is substantially identical to the embodiment of FIG. 3 except that the annular supporting member 20' has a portion of the surface thereof adjacent the cover member 11 covered by a thin layer 35 of the bladder material which is molded integrally therewith and the "0" ring 34' is an annulus molded integrally with the outer periphery of said thin layer 35. Thus, when the cover member 11 is secured to the threaded mouth of the container 10 as at 12, the annular rim 31 of the cover member when it abuts against such thin layer 35 will cut the latter when the cover member 11 is tightened to compress the thickened rim of the bladder against the annular seat 28. The bladder 13 of the embodiment of FIG. 4 also forms an oil chamber 14 and an air chamber 15 and has a thickened wall portion 26.

We claim:

1. A pressure vessel comprising a rigid container having an enlarged mouth, a cover member adapted to be secured to the mouth of said container, said cover member and said container having ports leading thereinto, a deformable partition in said container dividing the latter into two chambers each having variable volumes and in communication respectively with said ports, said deformable partition having a mouth, an annular supporting member having a portion thereof secured to the mouth of said bladder and having an additional portion extending outwardly from said first portion, said additional portion having a layer of resilient partition material on at least one surface thereof, the upper end of said container having an annular seat to receive at least a portion of said partition material, said cover member having an annular projection adapted to react against the other surface of said additional portion to press said partition material against said seat to form a resilient seal and defining an annular zone of retention of said annular supporting member, said upper end of said container having an annular surface to receive the outer periphery of said additional portion of said annular supporting member, said cover member having a portion thereof adapted to react against the outer periphery of said additional portion to urge the latter against said annular surface of said container to provide rigid retention of the outer periphery of said additional portion and defining a second annular zone of retention concentric with said first zone, said cover member having an annular groove between said two concentric annular zones, an annular sealing member positioned in said annular groove and adapted to be pressed against the other surface of said additional portion when the cover member is tightened, to provide an additional seal.

2. The combination set forth in claim 1 in which the enlarged mouth of said cover member has an externally threaded outer periphery, and said cover member has a depending internally threaded wall portion adapted to be screwed onto the threaded mouth of said container to secure said cover member to said container mouth.

3. The combination set forth in claim 1 in which the first sealing means provides a seal with respect to the fluid in one of said chambers and the second sealing means provides a seal with respect to the fluid in the other of said chambers.

4. The combination set forth in claim 1 in which a portion of the other surface of said annular supporting member has a thin layer of partition material secured thereto, said annular sealing member is formed integrally with the outer periphery of said thin layer of partition material and said depending annular projection of said cover member is adapted to cut into said relatively thin layer of partition material when said cover member is tightened.

5. A pressure vessel comprising a rigid container having an enlarged mouth having an externally threaded outer periphery, a cover member having a depending internally threaded wall portion adapted to be screwed onto the threaded mouth of said container, said cover member and said container having ports leading thereinto, a deformable partition in said container dividing the latter into two chambers each having variable volumes and in communication respectively with said ports, said deformable partition having a mouth, an annular supporting member having a portion thereof secured to the mouth of said bladder and having an additional portion extending outwardly from said first portion, said additional portion having a layer of resilient partition material on at least one surface thereof, the upper end of said container having an annular seat to receive at least a portion of said partition material, said cover member having an annular projection adapted to react against the other surface of said additional portion of press said partition material against said seat to form a resilient seal and defining one annular zone of retention of said annular supporting member, said upper end of said container having an annular surface to receive the outer periphery of said additional portion, said cover member having a portion thereof adapted to react against the outer periphery of said additional portion to urge the latter against said annular surface of said container to provide rigid retention of the outer periphery of said additional portion and defining a second annular zone of retention concentric with said first zone.

6. The combination set forth in claim 5 in which the annular projection of said cover member, when the latter is screwed onto the mouth of said container, engages the additional portion of said annular supporting member before reaction of said portion of the cover member against the outer periphery of said additional portion of said annular supporting member.

7. The combination set forth in claim 6 in which said annular supporting member is made of resilient material adapted to be slightly flexed when said annular projection first engages against said additional portion of said annular supporting member, before the outer periphery of the additional portion of said annular supporting member is urged against said annular surface of said container by reaction of said cover member against said additional portion.

8. The combination set forth in claim 5 in which said additional portion of said annular supporting member is substantially conical at least in the region thereof corresponding to the two annular zones of retention.

9. The combination set forth in claim 5 in which said additional portion of said annular supporting member is substantially perpendicular to the axis of said container at least in the region thereof corresponding to the two annular zones of retention.

10. The combination set forth in claim 5 in which the deformable partition is a bladder having an thickened rim to which the inner periphery of the annular supporting member is secured and the wall thickness of said bladder is reduced at an annular region spaced from the annular supporting member.

11. The combination set forth in claim 5 in which means are provided to restrain movement of the annular supporting member at least in the region thereof corresponding to the outer zone of retention.

* * * * *